(12) United States Patent
Marathe et al.

(10) Patent No.: US 12,198,690 B1
(45) Date of Patent: Jan. 14, 2025

(54) VOICE-BASED CONTENT ATTRIBUTION FOR SPEECH PROCESSING APPLICATIONS

(71) Applicant: Amazon Technologies, Inc., Seattle, WA (US)

(72) Inventors: Tejaswini Marathe, Seattle, WA (US); Girish Shekhar, Seattle, WA (US); Shubaa Jhanani Ayengar Devanathan, Bothell, WA (US); Sandeep Sankarlal, Bothell, WA (US); Claudia C. Clemente, Mercer Island, WA (US); Deepthi Chidambaram, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 666 days.

(21) Appl. No.: 17/534,153

(22) Filed: Nov. 23, 2021

(51) Int. Cl.
| | | |
|---|---|---|
| *G10L 15/22* | (2006.01) | |
| *G06F 40/205* | (2020.01) | |
| *G06F 40/284* | (2020.01) | |
| *G06F 40/30* | (2020.01) | |
| *G10L 13/02* | (2013.01) | |
| *G10L 15/18* | (2013.01) | |
| *G10L 15/30* | (2013.01) | |
| *H04L 67/146* | (2022.01) | |

(52) U.S. Cl.
CPC ............ *G10L 15/22* (2013.01); *G06F 40/205* (2020.01); *G06F 40/284* (2020.01); *G10L 13/02* (2013.01); *G10L 15/1822* (2013.01); *G10L 15/30* (2013.01); *H04L 67/146* (2013.01); *G06F 40/30* (2020.01); *G10L 15/1815* (2013.01); *G10L 2015/223* (2013.01)

(58) Field of Classification Search
CPC ..... G10L 15/22; G10L 15/1822; G10L 15/30; G10L 40/205; G06F 40/284; G06F 40/205; H04L 67/146
See application file for complete search history.

(56) References Cited

U.S. PATENT DOCUMENTS

| | | | | |
|---|---|---|---|---|
| 9,959,129 | B2 * | 5/2018 | Kannan | G10L 15/22 |
| 10,235,999 | B1 * | 3/2019 | Naughton | G10L 15/22 |
| 11,183,182 | B2 * | 11/2021 | Wang | G10L 15/1815 |
| 11,605,387 | B1 * | 3/2023 | Muralitharan | G10L 15/22 |

FOREIGN PATENT DOCUMENTS

| | | | | |
|---|---|---|---|---|
| AU | 2016247040 A1 * | 3/2017 | | G06F 16/3329 |
| AU | 2016320681 A1 * | 3/2018 | | G06F 16/00 |
| EP | 3241213 B1 * | 7/2019 | | G06F 3/167 |

(Continued)

*Primary Examiner* — Anne L Thomas-Homescu
(74) *Attorney, Agent, or Firm* — K&L Gates LLP

(57) ABSTRACT

Devices and techniques are generally described for voice-based content attribution for speech processing applications. In some examples, a request for voice-based content may be received from a first speech processing skill. First identifier data associated with the first speech processing skill may be received. A determination may be made that first content that is associated with the request. Voice-based output data describing the first content may be generated. A selection of the first content may be received. Attribution data may be determined based at least in part on the selection of the first content and the first identifier data. The attribution data may be sent to a remote computing device.

20 Claims, 7 Drawing Sheets

(56) References Cited

FOREIGN PATENT DOCUMENTS

| EP | 3757753 A1 | * | 12/2020 | ............. | G06F 1/169 |
| EP | 3839719 A1 | * | 6/2021 | ............. | G06F 3/167 |
| WO | WO-2016127795 A1 | * | 8/2016 | ............. | G10L 15/22 |
| WO | WO-2018212885 A1 | * | 11/2018 | ......... | G06F 16/3329 |
| WO | WO-2019216874 A1 | * | 11/2019 | ......... | G06F 3/04847 |

* cited by examiner

VOICE-BASED CONTENT ATTRIBUTION FOR SPEECH PROCESSING APPLICATIONS

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
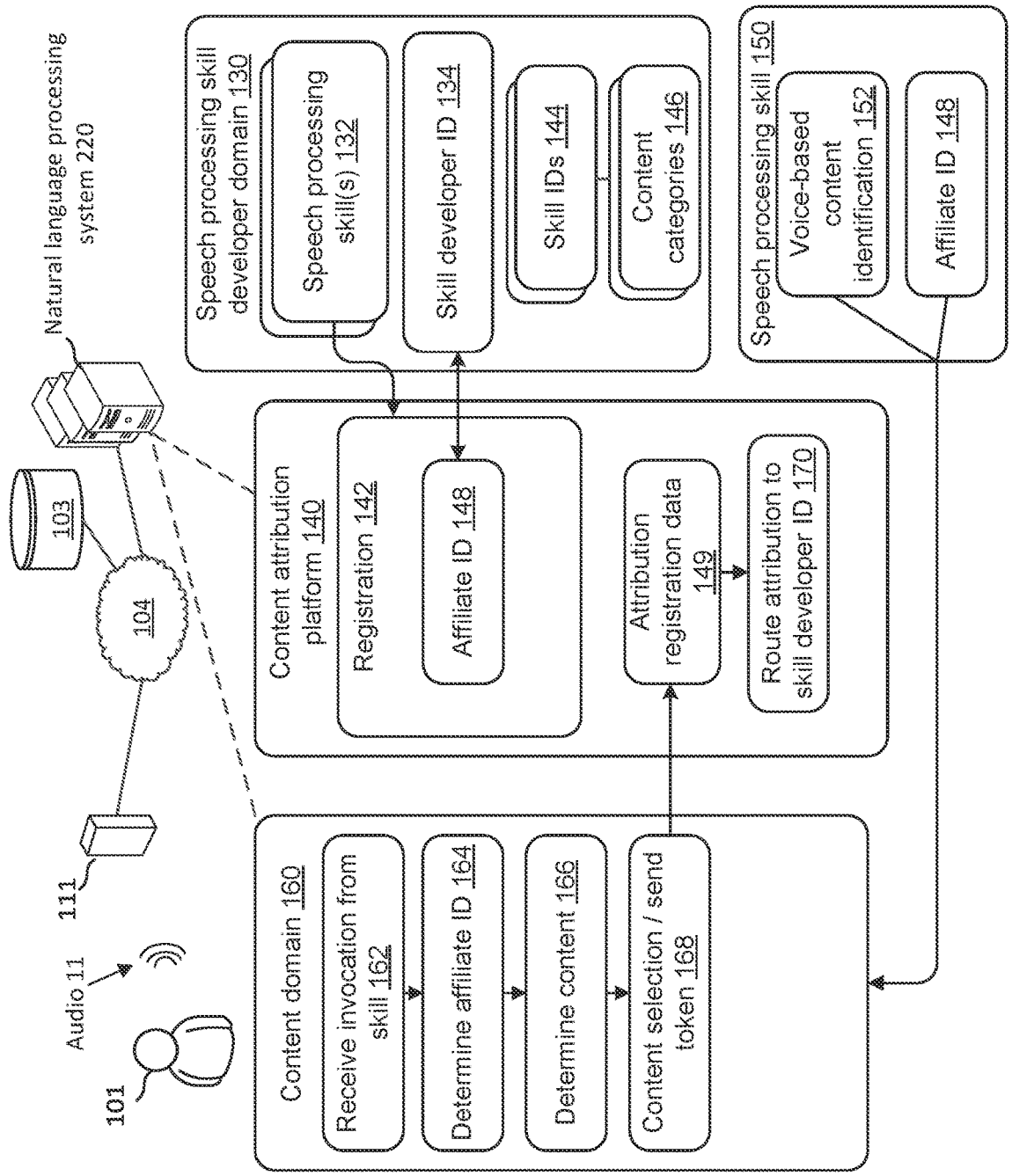
FIG. 1 is a block diagram illustrating a system for voice-based content attribution, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. As described in further detail below, in some examples, NLU processing may include multiple different processes that may be executed for a given natural language input in order to determine a semantic interpretation of the natural language input. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a speech processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more user's.

Natural language processing systems may be configured with multiple natural language processing applications (e.g., thousands, tens of thousands, or more applications) that can be used to potentially respond to a user request. Applications may be referred to herein as "skills" (e.g., speech processing skills). Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

Skills may often be developed by third party developers relative to the natural language processing platforms for which the skills are developed and deployed. Allowing third party developers to develop and deploy their own skills allows for such third parties to create customized experiences for their users. In various examples, the natural language processing system on which such skills are deployed may include various first-party systems for selection of and/or consumption of content (e.g., first party music playback skills, first party video playback skills, first party shopping skills, etc.). Skill developers may want to recommend various content that is available for user selection via a first party system that is different from the third party skill experience. For example, a third party skill executing on Amazon's Alexa speech processing system may want to recommend a movie that is available for playback on the Amazon Prime video streaming service. Third party skill developers can provide such a recommendation. However, when the user leaves the skill experience (e.g., to begin playback of the movie via the first party streaming service) there is currently no attribution mechanism to attribute the user's selection of the content with the third party skill. Currently it is difficult to determine that the user selected content that was recommended and/or mentioned during the third party skill experience, since the third party skill experience is separate from (and controlled by a different entity) the first party system that is providing the content experience.

Described herein are systems and techniques for providing voice-based content attribution for speech processing skills. Skill developers are provided with a registration process to register their skills with a content attribution platform. The skill developers can specify individual content items for attribution. The content attribution platform generates an affiliate ID (e.g., identifier data for the skill developer) and provides the affiliate ID to the skill developer. Thereafter, as part of the skill experience, the skill developer may request voice-based information related to one or more specified content items be output by the first party natural language processing system. For example, the skill developer may provide the affiliate ID and data identifying the particular content (e.g., content identification data (content ID)) to the relevant content domain (e.g., to the movie playback domain in the foregoing example). The content domain may provide voice-based data (e.g., audio data representing synthesized human speech) regarding the content ID that may be output as part of the skill experience. Additionally, the content domain may create a unique session identifier that associates the output of the voice-based data with the affiliate ID. The session identifier may specify an amount of time during which a user selection of the recommended content will result in attribution. If a user (at some later point in time after the skill provides the recommendation) selects the content, the content ID may be used to lookup the affiliate ID and a determination may be made as to whether the session is still valid. Attribution data (e.g., an account credit, a concession, etc.) may be provided to a computing device associated with the skill developer. In various examples, the particular attribution data provided and the skill developer account may be specified during the registration process. Further, although selection of content is generally described herein as being an event for which attribution is provided, in some examples, the terms "selection" and "content" may be broadly defined to include a desired action that is recommended by a skill developer. For example, the skill developer may recommend that a user sign up for a particular service or account. The attribution may be provided when the user signs up during a valid session after the skill has recommended the action.

In various examples, a natural language processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further speech processing (e.g., ASR, NLU, etc.). In various examples, the wakeword detection component may be used to distinguish between audio that is intended for the natural language processing system and audio that is not intended for the natural language processing system.

FIG. 1 is a block diagram illustrating a system for voice-based content attribution, according to various embodiments of the present disclosure. In the example depicted in FIG. 1, a natural language processing system 220 may include one or more computing devices that may be used to implement the content domain 160 and/or the content attribution platform 140. The natural language processing system 220 may include and/or be configured in communication with non-transitory computer-readable memory 103 over a network 104. The one or more computing devices of natural language processing system 220 may be configured in communication with one another over the network 104. Additionally, the speech processing skill developer domain 130 and/or the speech processing skill 150 may be implemented by one or more computing devices and these computing devices may be in communication with the content domain 160 and/or the content attribution platform 140 via network 104.

Network 104 may be a communication network such as a local area network (LAN). However, the various computing devices (e.g., the natural language processing system 220) in FIG. 1 may also be configured in communication with a wide area network (e.g., the Internet). Non-transitory computer-readable memory 103 may store instructions that may be effective to perform one or more of the various techniques described herein. For example, the instructions may be effective to implement (in whole or in part) the content attribution platform 140 and/or the content domain 160.

In various examples, a user 101 may communicate with a natural language processing enabled device 111 using spoken requests (e.g., audio 11). The natural language processing enabled device 111 may include one or more microphones and may be effective to detect wakewords spoken by user 101 and may transmit subsequently recorded audio to a natural language processing system 220 for further processing. In various examples, and as described below in reference to FIG. 7, the natural language processing system 220 may be implemented, wholly or in part, by the natural language processing enabled device 111. In various examples, the natural language processing enabled device 111 may be configured in communication with the natural language processing system 220.

In an example, a speech processing skill developer domain 130 may be used by a skill developer to develop one or more speech processing skills 132. The speech processing skills 132 may provide various functionality and user experiences, according to the specific implementation of such skills by the skill developer. In general, the speech processing skills 132 may provide a voice-based interface with which the user 101 may communicate. As described in further detail in reference to FIG. 2, various components of the natural language processing system 220 may be used by the speech processing skills 132 to translate user requests into actionable commands that can be processed using the logic of the speech processing skills 132.

In the example of FIG. 1, a developer may want to register one or more of the speech processing skills 132 for content attribution. Accordingly, the speech processing skill developer domain 130 may send a skill developer ID (data identifying the skill developer and distinguishing the skill developer from among other skill developers) to the content attribution platform 140 as part of registration 142. Additionally, the speech processing skill developer domain 130 may declare skill IDs (data identifying the particular skills being registered for attribution) within a manifest file for the particular skill. The skill developer may also identify content categories 146 and/or individual content items in the skill manifest for each of the one or more skill IDs 144 for which attribution is desired. For example, for a first movie recommendation skill, the skill developer may identify the content category 146 "movies" as the skill may intend to recommend various movies to users of the skill. The registration 142 process of content attribution platform 140 may generate an affiliate ID 148 and may associate the affiliate ID 148 with the skill developer (e.g., with skill developer ID 134). In various examples, registration 142 may be performed using a graphical user interface and/or a website through which the skill developer may register their skills and specify the content for which attribution is desired.

Speech processing skill 150 (e.g., a skill deployed by the developer associated with speech processing skill developer domain 130) may employ the particular content domain 160 in order to generate a voice-based description of content that the skill intends to recommend to a user (e.g., user 101). This content may be identified among the content categories 146 (and/or individual content items) that have been declared by the speech processing skill 150 for attribution (e.g., in the skill manifest). For example, the speech processing skill 150 may intend to recommend Movie X. Accordingly, the speech processing skill 150 may send a voice-based content identification 152 to content domain 160. The voice-based content identification 152 may be data that identifies the content for which a voice-based content description is requested. Additionally, the speech processing skill 150 may send the affiliate ID 148 (e.g., the affiliate ID generated for the particular speech processing skill 150 during registration 142) to the content domain 160.

The content domain 160 may receive the invocation from the skill (block 162). The content domain 160 may determine the affiliate ID included in the invocation (block 164) and may determine specific voice-based content for output the content identified by the voice-based content identification 152 (block 166). The content domain 160 may generate tag data comprising a unique session identifier data (e.g., a session ID) for the voice-based content identification 152. The session ID tag data may also include the content ID for the content that the content domain 160 has selected for output along with the affiliate ID 148 received from the speech processing skill 150. The unique session ID may be associated with a particular amount of time (e.g., an attribution time window) during which attribution to the skill developer ID 134 may be provided if the user selects the content or otherwise performs a recommended action with respect to the content. In various examples, the content domain 160 may provide audio data describing the requested content (e.g., a title of the content, a rental price of the content, a description of the content, a manufacturer of the content, etc.) and may output the audio data on the user 101's device. From the user 101's perspective, this output of the audio data related to the content may appear to be part of the experience that is associated with the speech processing skill 150, as the audio data may be output while the user 101 is interacting with the speech processing skill 150.

Thereafter, the user 101 may interact with the speech processing skill 150 to select the content. For example, the speech processing skill 150 may output the audio, "Speaking of action movies, would you like to hear about some action movies available for playback now?" If the user indicates that they would like to receive such information, the content domain 160 may provide the audio data describing the relevant content determined at block 166 (e.g., "[Movie_title] was released on [content description] and stars [actor names from content description], would you like to rent it?" If the user selects the content (e.g., by responding "Yes" in the current example), the content domain 160 may process the content selection and may determine if the session ID associated with the content ID remains valid (block 168). If the session ID is valid (e.g., unexpired), the content domain 160 may parse the session ID tag data and may generate a token comprising the content ID, the affiliate ID, and/or the session ID. In various examples, the token may include other data (e.g., other account identifier data (e.g., associate ID, user ID) marketplace data, etc.). The content domain 160 may control output of the content on the relevant user device (if applicable based on the particular type of content selection (e.g., music playback)) and/or may otherwise process the content selection (e.g., complete a purchase, add an item to cart, etc.). The token may be published using a messaging protocol (e.g., an event driven architecture). The content attribution platform 140 may subscribe to the channel on which the token message is published and may determine that the published token includes an affiliate ID that is associated with attribution registration data 149 (e.g., for the relevant skill developer). The attribution data (e.g., an account credit, a concession, etc.) may be routed to the skill developer ID (block 170) and associated with the skill developer's account. In various examples, the particular attribution data may be agreed upon during registration 142. Additionally, the content domain 160 may send an acknowledgement message to the speech processing skill 150 that acknowledges the selection of the particular content (not shown in FIG. 1).

Figure 2:
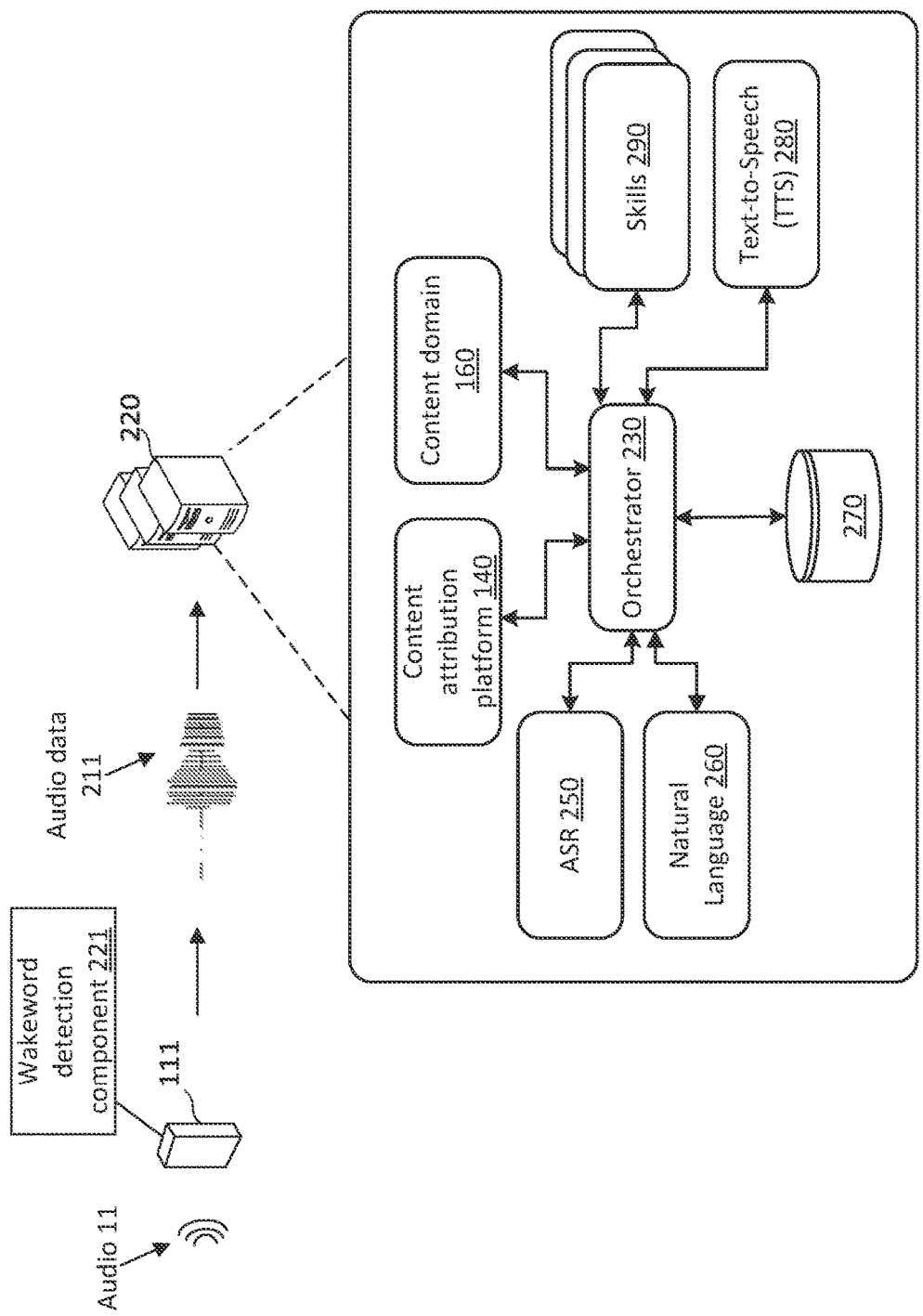
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator 230 may route the intent to one or more skills 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device 120 that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill 290a which may correspond to a service for performing media processing that may be operated, for example, by a media processing unit (MPU).

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The content domain 160 may be any domain associated with a particular type of content. For example, content domain 160 may relate to a music domain, a knowledge domain (e.g., a question and answer domain), a movie/video domain, a shopping domain, etc. Such content domains 160 may be implemented similarly to the skills 290. However, the content domains 160 generally refer to applications and/or systems developed by the same entity as the other components of the natural language processing system 220 (e.g., the same entity as the NLU component 260, the ASR component 250, the orchestrator 230, and/or the TTS component 280). Conversely, skills 290 may generally refer to speech processing skills implemented by third parties, but which communicate with the aforementioned components of the natural language processing system 220.

The content domain 160 may receive requests from skills 290 that have registered for attribution via content attribution platform 140 (as described above). Upon receipt of a content ID from a skill 290, the content domain 160 may create a session ID and store the session ID in a data store in association with the affiliate ID provided by the registered skill 290. As previously described, the content domain 160 may generate audio data representing a description of the content to be recommended (e.g., the content identified by the content ID received from the registered skill 290). In various examples, the text-to-speech component 280 may be used to generate the audio data. The audio data may be sent to the requesting skill for output as part of the skill experience. In other examples, the skill 290 may itself generate the content recommendation. However, even in such examples, the skill 290 may provide the content ID to the content domain 160 so that the session ID may be generated for proper attribution.

Thereafter, if a user selects the content prior to the expiration of the session ID, the affiliate ID may be looked up using the content. The affiliate ID may be used to determine the session ID and a determination may be made of whether the session ID is valid (or has expired). If valid, the attribution data associated with selection of the content may be determined from content attribution platform 140 and may be sent to the skill developer (e.g., attributed to the skill developer's account).

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user. In various examples, profile storage 270 may be associated with the skill developer and thus may store the skill developer ID 134, the affiliate ID 148, attribution registration data 149 including one or more applicable categories (e.g., content categories 146 for which the skill developer has registered with the content attribution platform 140, etc.).

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
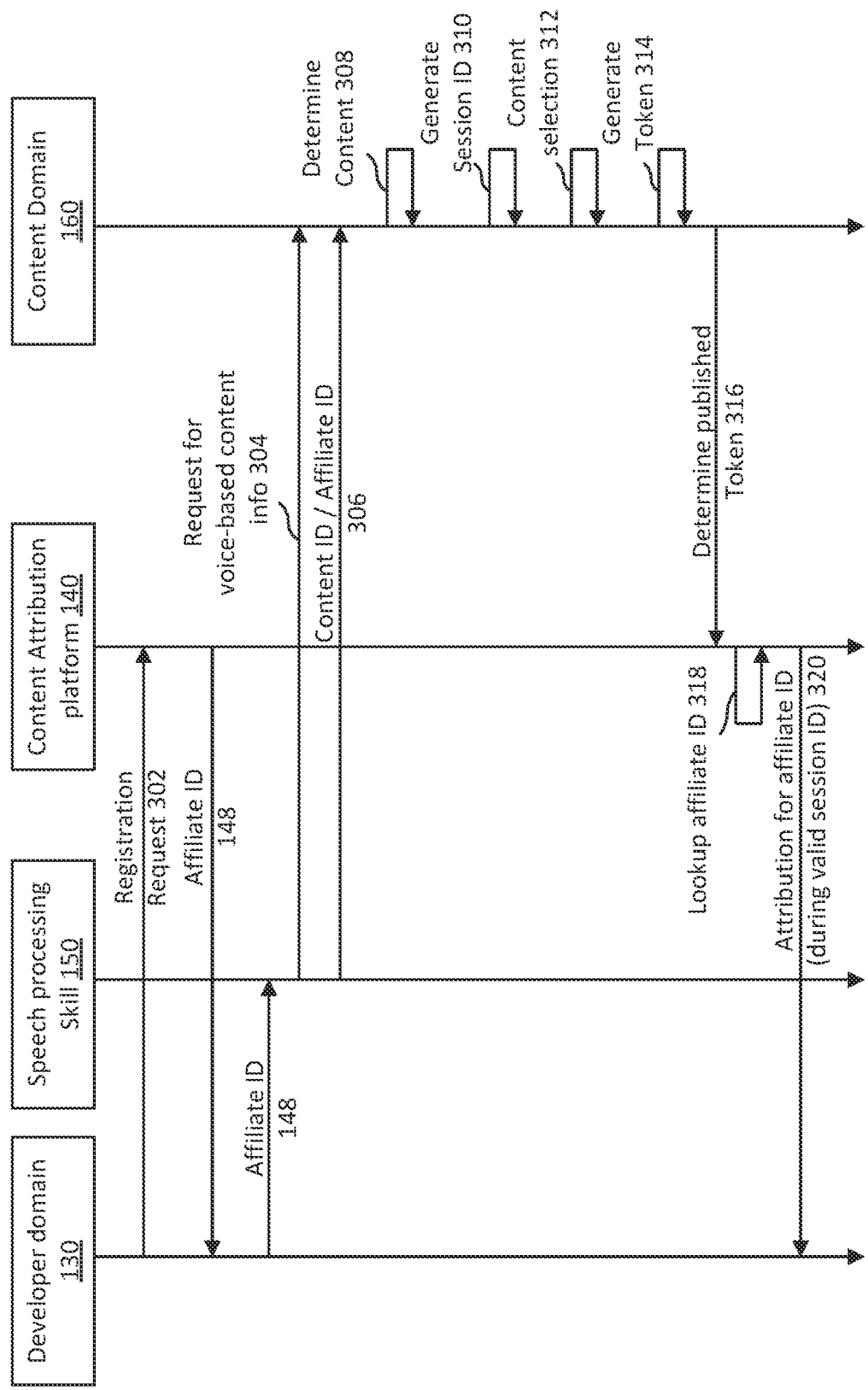
FIG. 3 is a sequence diagram illustrating voice-based content attribution for a speech processing skill, in accordance with various embodiments described herein.

FIG. 3 is a sequence diagram illustrating voice-based content attribution for a developer domain 130 associated with a speech processing skill 150, in accordance with various embodiments described herein. Developer domain 130 may register with content attribution platform 140 using registration request 302. In various examples, registration may be performed using a graphical user interface at a uniform resource locator (URL) provided by content attribution platform 140. The developer may register speech processing skill 150 with the content attribution platform 140. In some examples, registration may include specifying one or more skills to be registered as well as specifying one or more content items and/or categories of content for which attribution should be provided. However, as described previously, in some examples, the developer may register using an account associated with the developer. Thereafter, the developer may include content items/categories and/or requests for attribution in manifest data of the speech processing skill 150 for which attribution is desired. In some examples, the developer domain 130 may select from among various recommendation templates for content recommendation on the speech processing skill 150. Such templates may provide code that can be incorporated by the speech processing skill 150 in order to automatically recommend the desired content item(s) to users of the speech processing skill 150. Templates may include logic to determine whether to recommend content, how to select the appropriate content, when to surface the recommendation, etc. After registration is completed, the content attribution platform 140 may generate the affiliate ID for the skill developer and may send the affiliate ID 148 to the developer domain 130. The developer domain 130 may incorporate the affiliate ID 148 in any speech processing skills (e.g., speech processing skill 150), as desired.

Thereafter (e.g., during user interaction with the speech processing skill 150), the speech processing skill 150 may send a request for voice-based content information (action 304). The request may be for content that pertains to the skill experience. For example, the speech processing skill 150 may be an exercise skill. Accordingly, following a floor exercise, the speech processing skill 150 may output the prompt "Would you like to hear information about yoga mats?" If the user assents, the request for voice-based content 304 include a content ID that identifies the content category "yoga mats". Additionally, the speech processing skill 150 may send the affiliate ID 148 to the content domain 160 along with the content ID (action 306). The content ID may identify the particular content for which the voice-based content recommendation is to be generated. The content domain 160 may identify the content using the content ID (action 308) and may provide the relevant information (e.g., item title, item price, etc.) as audio data using TTS component 280 of natural language processing system 220. The content domain 160 may output the voice-based content data for the content ID (e.g., audio data describing the content) as a recommendation while the user is interacting with the speech processing skill 150.

Additionally, the content domain 160 may generate a session identifier data (e.g., a session ID) for the content ID and the particular affiliate ID 148 (action 310). In some examples, this may be performed concurrently with determining the voice-based content data. Thereafter, at some later point in time, the content domain 160 may receive data indicating content selection (action 312). For example, the user may respond to the content recommendation output by the content domain 160 with a request to select the recommended content. However, in various other examples, the content selection may be sent by another device associated with the user's account. For example, the content recommendation may be provided by user interaction with the speech processing skill 150/content domain 160 using a voice-enabled device. However, the user may not initially take any action in response to the voice-based content recommendation. However, later the same day (or at some other subsequent point in time), the user may log into an account with the content domain 160 and may select the content (e.g., using a different device). Accordingly, the content selection (block 312) may, in some cases, be provided by a different device and/or component that is separate than the experience provided using the natural language processing system 220, the speech processing skill 150, and/or the voice-based interface of the content domain 160.

The content domain 160 may verify that the session ID tag that is associated with the content ID is valid (e.g., unexpired) concurrently with or after content selection 312. The session ID tag may be associated with the content at the content determination stage (e.g., action 308). Upon determining that the session ID is valid, the content domain 160 may generate a token (block 314). The token may comprise a representation of the session ID, the content ID, and the affiliate ID (with each being determined using the tag data of the session ID). The content domain 160 may publish the token using a messaging protocol to which the content attribution platform 140 subscribes. Accordingly, at action 316, the content attribution platform 140 may parse the token to determine the affiliate ID and the content ID. The content attribution platform 140 may use the affiliate ID to lookup registration data that is associated with the affiliate ID at action 318. The registration data may define what types of attribution data correspond to different content IDs and/or different categories of content (among other things). The content attribution platform 140 may send the attribution data for the relevant affiliate ID (and/or specific to the content ID/content category) to the developer domain 130 at action 320. For example, a credit may be applied to an account associated with the developer domain 130.

Figure 4:
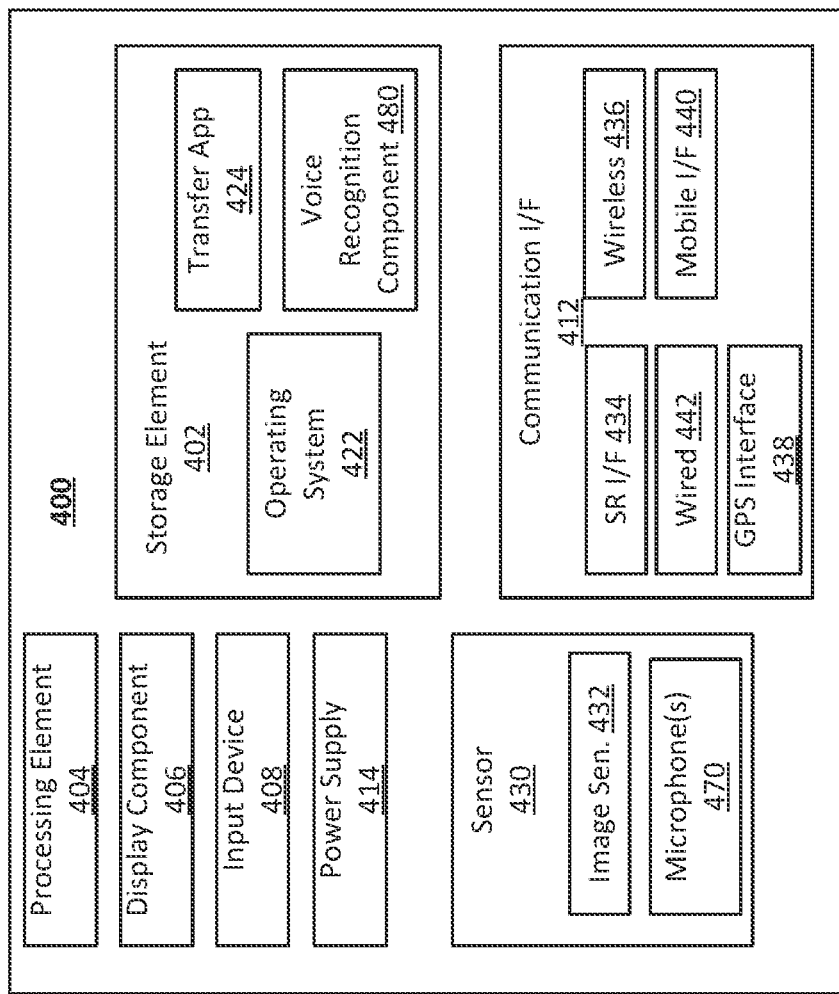
FIG. 4 is a block diagram showing an example architecture of a computing device that may be used in accordance with various embodiments described herein.

FIG. 4 is a block diagram showing an example architecture 400 of a network-connected device that may be used to implement, at least in part, a speech processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
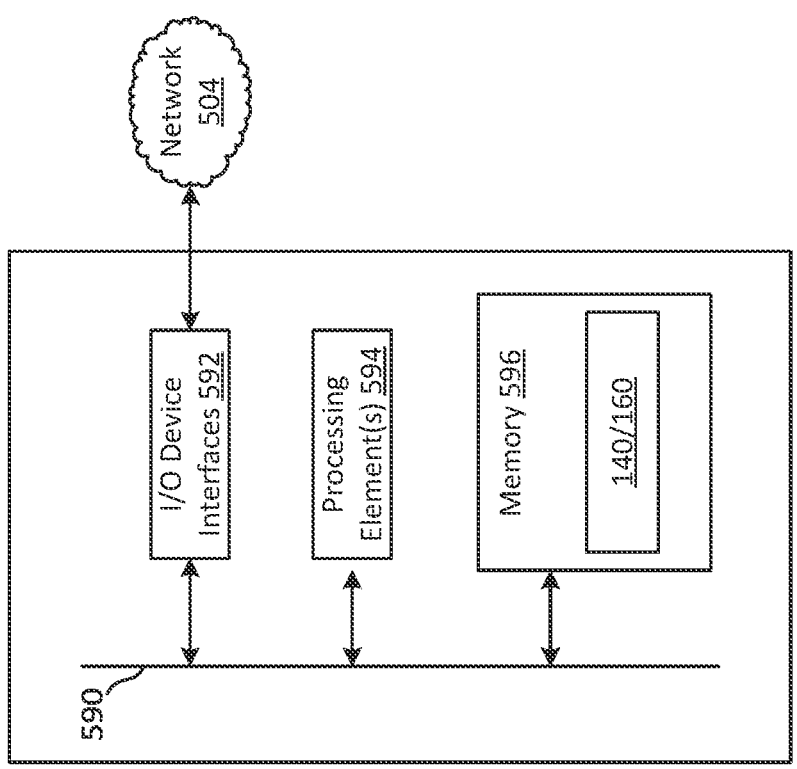
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, content attribution platform 140 and content domain 160 are depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of natural language processing system 220 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
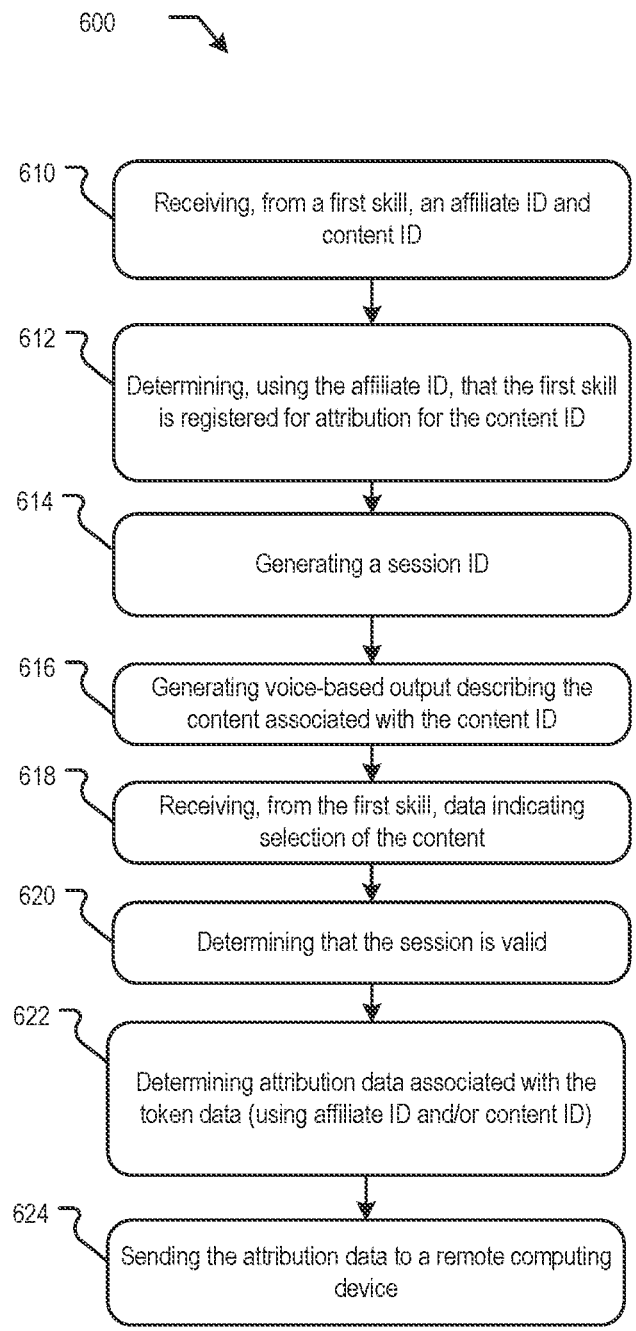
FIG. 6 depicts a flow chart showing an example process for voice-based content attribution, in accordance with various aspects of the present disclosure.

FIG. 6 depicts a flow chart showing an example process 600 for voice-based content attribution, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which an affiliate ID and a content ID may be received from a first skill. A developer of the skill may have previously registered with content attribution platform 140 for voice-based content attribution for selections of content corresponding to the content ID. In various examples, affiliate ID and the content ID received at action 610 may be received as part of a request to the content domain 160 to provide voice-based content data (e.g., a title, description, price, etc., corresponding to the content ID).

Processing may continue at action 612, at which the affiliate ID received at action 610 may be used to determine that the first skill is registered for attribution for the content ID. The content domain 160 may determine content data for output using the natural language processing system (e.g., TTS 280) based on the content ID received from the first skill. In response to determining that the first skill is registered for attribution for the provided content ID, processing may continue to action 614, at which a session ID may be generated. The session ID may relate to the recommendation by the content domain 160 of the content corresponding to the content ID. The session ID may be associated with a time to live (TTL) value and may expire after expiration of the TTL. The session ID may comprise and/or may be included in tag data that may be associated with the content. The session ID may include the affiliate ID and the content ID for the content.

Processing may continue to action 616, at which voice-based output describing the content that is associated with the content ID may be generated. As previously described, the voice-based output may be audio data describing various aspects of the content such as a brand of the content, a title of the content, actors appearing in the content (e.g., for a movie), an album title (for music), etc. The voice-based output may be output by the content domain 160 using the natural language processing system 220. As previously described, the voice-based output may appear to the user to be part of the skill experience of the first skill since the content domain 160 may output the content information during the user's interaction with the first skill.

In the example depicted in FIG. 6, processing may continue at action 618, at which data indicating selection of the first content may be received by the content domain 160. The content may be selected by the user in various ways. For example, the user may use a speech-based interaction with the content domain 160 to select the recommended content (e.g., "Yes, Alexa, order that movie."). However, in other examples, the user may select the content on a different device that the user is logged into.

Processing may continue to action 620, at which a determination may be made that the session is valid. For example, upon the user selecting the content, the session ID tag data associated with the content may be parsed to determine the affiliate ID, the content ID, and the TTL value associated with the session. If the session is not expired, the content domain 160 may generate token data that includes a representation of the affiliate ID, the content ID, and the session ID and may publish the token data using a messaging protocol.

At action 622, the content attribution platform 140 may receive the token and may parse the token data to determine the affiliate ID and the content ID. The content attribution platform 140 may determine the appropriate attribution data that is associated with the affiliate ID and with the content ID. In some examples, different attribution data may be associated with different categories of content. For example, the attribution data associated with content category 1 may include a first type of developer concession/credit, while the attribution data associated with content category 2 may include a second type of developer concession/credit. Accordingly, the content ID of the token data may be used to determine the appropriate attribution data. In the current example, if the session is no longer valid (e.g., the session is expired due to greater than the TTL amount of time passing since the session was generated), no token data may be published by the content domain 160, resulting in no attribution data being credited to the developer of the first skill.

In various examples, the attribution data may be specified and/or agreed upon during the registration process. For example, the attribution data may include a credit to the skill developer account. In some cases, the credit may be proportional to a purchase price of the content. In various other examples, the attribution data may permit the developer to take one or more special actions and/or may provide a special status to the skill developer's account to enable the skill developer to perform otherwise non-allowed actions.

Processing may continue to action 624, at which the attribution data may be sent to a remote computing device. In various data, sending the attribution data to a remote computing device may comprise storing the attribution data in association with the skill developer's account. However, in various other examples, sending the attribution data may include sending an invoice and/or other data to the skill developer at a particular computing device associated with the skill developer.

Figure 7:
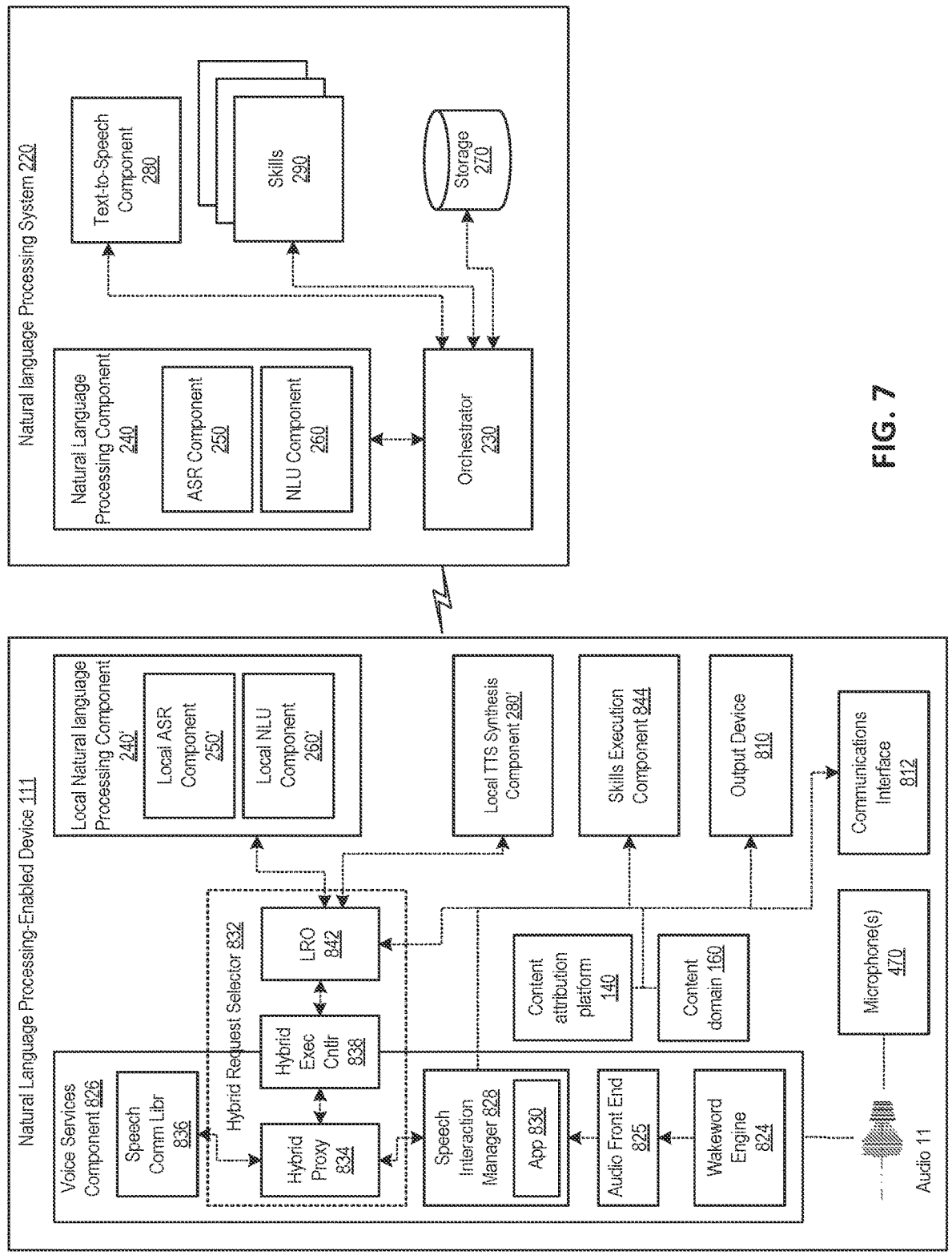
FIG. 7 is a block diagram illustrating a natural language processing-enabled device and a natural language processing management system, in accordance with embodiments of the present disclosure.

FIG. 7 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the IoT devices described herein that are local to (e.g., communicating on the same LAN) the network-connected devices 120. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 810 (e.g., speakers, displays, and/or other IoT devices among network-connected devices 120) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include the content attribution platform 140 and/or the content domain 160. In various other examples, although not shown in FIG. 7, the natural language processing system 220 may incorporate the content attribution platform 140 and/or the content domain 160. In still other examples, these components may be implemented using other computing devices that are configured in communication with the device 111 and/or the natural language processing system 220.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio 11, the device 111 may additionally, or alternatively, receive audio 11 (e.g., via the communications interface 812) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio 11 from the device 111, to recognize speech in the received audio 11, and to perform functions in response to the recognized speech. In some embodiments, these functions involve sending a command, from the natural language processing system 220, to the device 111 to cause the device 111 to perform an action, such as output an audible response to the user speech via output device 810 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 810 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 826. When a user utterance including the wakeword is captured by the microphone 470 of the device 111, the audio 11 representing the utterance is received by a wakeword engine 824 of the voice services component 826. The wakeword engine 824 may be configured to compare the audio 11 to stored models used to detect a wakeword (e.g., "Computer") that indicates to the device 111 that the audio 11 is to be processed for determining an intent. Thus, the wakeword engine 824 is configured to determine whether a wakeword is detected in the audio 11, and, if a wakeword is detected, the wakeword engine 824 can proceed with routing the audio 11 to an audio front end (AFE) 825 (sometimes referred to as an acoustic front end (AFE)) of the voice services component 826. If a wakeword is not detected in the audio 11, the wakeword engine 824 can refrain from sending the audio 11 to the AFE 825, thereby preventing the audio 11 from being further processed. The audio 11 can be discarded.

The AFE 825 is configured to transform the audio 11 received from the wakeword engine 824 into data for processing by a suitable ASR component and/or NLU component. The AFE 825 may reduce noise in the audio 11 and divide the digitized audio 11 into frames representing a time intervals for which the AFE 825 determines a number of values, called features, representing the qualities of the audio 11, along with a set of those values, called a feature vector, representing the features/qualities of the audio 11 within the frame. Many different features may be determined, and each feature represents some quality of the audio 11 that may be useful for ASR processing and/or NLU processing. A number of approaches may be used by the AFE 825 to process the audio 11, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio 11. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio 11, used by the AFE 825 in beamforming, may be determined based on results of the wakeword engine 824's processing of the audio 11. For example, the wakeword engine 824 may detect the wakeword in the audio 11 from a first microphone 470 at time, t, while detecting the wakeword in the audio 11 from a second microphone 470 a millisecond later in time (e.g., time, t+1 millisecond), and so on and so forth, for any suitable number of audio signals corresponding to multiple microphones 470 in a microphone array.

A speech interaction manager (SIM) 828 of the voice services component 826 may receive the audio 11 that has been processed by the AFE 825. The SIM 828 may manage received audio 11 by processing request data and non-speech noise or sounds as events, and the SIM 828 may also manage the processing of commands that are used to respond to the user speech or non-speech noise or sounds (e.g., by controlling the action(s) of natural language processing components of device 111). The SIM 828 may include one or more client applications 830 for performing various functions at the device 111.

A hybrid request selector component 832 of the device 111 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 220. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 220 can be sent to the HEC 838 using the HP 834, which sits in the path between the SCL 836 and the SIM 828. The HP 834 may also be configured to allow audio 11 received from the SIM 828 to pass through to the natural language processing system 220 (via the SCL 836) while also receiving (e.g., intercepting) this audio 11 and sending the received audio 11 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio 11 (e.g., audio 11 representing user speech, audio 11 representing non-speech noise or sounds, etc.). In some embodiments, the hybrid request selector component 832 may further include a local request orchestrator component (LRO) 842. The LRO 842 is configured to notify the local natural language processing component 240' about the availability of new audio 11 that represents user speech, and to otherwise initiate the operations of the local natural language processing component 240' when new audio 11 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio 11 (e.g., by instructing the local natural language processing component 240' to execute on a previously-determined intent in order to generate a command). Meanwhile, a "terminate" event may instruct the local natural language processing component 240' to terminate further execution based on the audio 11, such as when the device 111 receives command data from the natural language processing system 220 and chooses to use that remotely-generated command data.

The LRO 842 may interact with a skills execution component 844 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio 11 is received by the wakeword engine 824, which detects the wakeword "Computer," and forwards the audio 11 to the SIM 828 via the AFE 825 as a result of detecting the wakeword. The SIM 828 may send the audio 11 to the HP 834, and the HP 834 may allow the audio 11 to pass through to the natural language processing system 220 (e.g., via the SCL 836), and the HP 834 may also input the audio 11 to the local natural language processing component 240' by routing the audio 11 through the HEC 838 of the hybrid request selector 832, whereby the LRO 842 notifies the local natural language processing component 240' of the incoming audio 11. At this point, the hybrid request selector 832 may wait for response data from the natural language processing system 220 and/or the local natural language processing component 240'.

The local natural language processing component 240' is configured to receive the audio 11 from the hybrid request selector 832 as input, to recognize speech (and/or non-speech audio events) in the audio 11, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio 11 to convert the audio 11 into text data (sometimes referred to herein as "ASR text data," an "ASR result", or "ASR data"). ASR transcribes audio 11 into text data representing the words of the user speech contained in the audio 11. A spoken utterance in the audio 11 can be input to the local ASR component 250', which then interprets the utterance based on the similarity between the utterance and pre-established language models available to the local natural language processing component 240'. In some embodiments, the local ASR component 250' outputs the most likely text recognized in the audio 11, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio 11 to the natural language processing system 220 for processing. As described above, the device 111 may capture audio using the microphone 470, and send audio 11 (e.g., representing a spoken user request), corresponding to the captured audio, to the natural language processing system 220. The device 111 may include a wakeword detection component that detects when input audio includes a spoken wakeword, and when the wakeword is detected, the audio 11 is sent by the device 111 to the natural language processing system 220.

Upon receipt by the natural language processing system 220, the audio 11 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio 11 to a natural language processing component 240. An ASR component 250 of the natural language processing component 240 transcribes the audio 11 into one or more hypotheses representing speech contained in the audio 11. The natural language processing component 240 interprets the speech in the audio data based on a similarity between the characteristics of the audio data corresponding to the speech and pre-established language models. For example, the natural language processing component 240 may compare the audio 11 with models for sounds (e.g., subword units such as phonemes) and sequences of sounds to identify words that match the sequence of sounds in the speech represented in the audio 11. The natural language processing component 240 may send text data generated thereby to an NLU component 260 of the natural language processing component 240. The text data output by the natural language processing component 240 may include a top scoring hypothesis of the speech represented in the audio 11 or may include an N-best list including a group of hypotheses of the speech represented in the audio 11, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of voice-based content selection attribution comprising:
   receiving, from a first speech processing skill, a request for first voice-based content;
   receiving, from the first speech processing skill, first identifier data associated with an account associated with a developer of the first speech processing skill;
   determining first content for output in response to the request;
   generating session identifier data comprising the first identifier data and content identifier data that identifies the first content;
   generating voice-based output data describing the first content;
   receiving a selection of the first content;
   determining, in response to the selection of the first content, the first identifier data and the content identifier data by parsing the session identifier data;
   determining attribution registration data associated with the first identifier data, the attribution registration data defining applicable categories of content;
   determining that the content identifier data is associated with the applicable categories of content using the attribution registration data;
   determining attribution data associated with the attribution registration data; and
   sending to a remote computing device, the attribution data.

2. The method of claim 1, further comprising:
   receiving, from the remote computing device, a first registration request;
   sending, to the remote computing device, the first identifier data;
   generating first skill data for the first speech processing skill that represents the applicable categories of content;
   storing the first identifier data in a first data store in association with the attribution registration data.

3. The method of claim 1, further comprising:
determining, in response to the selection of the first content, a time to live (TTL) value associated with the session identifier data;
determining that the selection of the first content occurred before expiration of the TTL value; and
generating a token comprising the first identifier data, the session identifier data, and the content identifier data, wherein the determining the attribution registration data is performed in response to parsing the token.

4. A method comprising:
receiving, from a first speech processing skill, a request for voice-based content;
receiving first identifier data associated with the first speech processing skill;
determining first content that is associated with the request;
generating voice-based output data describing the first content;
receiving a selection of the first content;
determining attribution data based at least in part on the selection of the first content and the first identifier data; and
sending the attribution data to a remote computing device.

5. The method of claim 4, further comprising:
receiving, by a natural language processing system from the first speech processing skill, content identifier data included in the request;
determining the first content using the content identifier data; and
generating, by a text to speech component, the voice-based output data describing the first content.

6. The method of claim 5, further comprising generating session identifier data comprising the content identifier data and the first identifier data, wherein the session identifier data identifies a session that defines an amount of time during which the attribution data may be provided to the remote computing device in response to the selection of the first content.

7. The method of claim 4, further comprising:
determining, in response to the receiving the selection of the first content, that the first identifier data is associated with the first content;
determining that the selection of the first content occurred within a valid session; and
sending the attribution data to the remote computing device based at least in part on the selection of the first content occurring within a valid session.

8. The method of claim 4, further comprising:
receiving a registration request;
determining, using the first speech processing skill, content identification data identifying one or more categories of content and/or one or more content items associated with attribution; and
generating, in response to the registration request, the first identifier data.

9. The method of claim 4, further comprising:
determining, in response to the selection of the first content, the first identifier data associated with the first content;
generating token data comprising the first identifier data and content identifier data identifying the first content; and
publishing the token data using a messaging protocol.

10. The method of claim 9, further comprising:
receiving, by a content attribution platform, the token data;
parsing the token data to determine the first identifier data and the content identifier data; and
looking up the attribution data using the first identifier data.

11. The method of claim 10, further comprising:
determining one or more categories of content indicated by the attribution data;
determining that the content identifier data pertains to a first category of content of the one or more categories, wherein the attribution data is specific to the first category of content.

12. The method of claim 4, further comprising controlling output of the voice-based output data during operation of the first speech processing skill.

13. A system comprising:
at least one processor; and
non-transitory computer-readable memory storing instructions that, when executed by the at least one processor, are effective to:
receive, from a first speech processing skill, a request for voice-based content;
receive first identifier data associated with the first speech processing skill;
determine first content that is associated with the request;
generate voice-based output data describing the first content;
receive a selection of the first content;
determine attribution data based at least in part on the selection of the first content and the first identifier data; and
send the attribution data to a remote computing device.

14. The system of claim 13, the non-transitory computer-readable memory storing further instructions that, when executed by the at least one processor, are further effective to:
receive, by a natural language processing system from the first speech processing skill, content identifier data included in the request;
determine the first content using the content identifier data; and
generate, by a text to speech component, the voice-based output data describing the first content.

15. The system of claim 14, the non-transitory computer-readable memory storing further instructions that, when executed by the at least one processor, are further effective to:
generate session identifier data comprising the content identifier data and the first identifier data, wherein the session identifier data identifies a session that defines an amount of time during which the attribution data may be provided to the remote computing device in response to the selection of the first content.

16. The system of claim 13, the non-transitory computer-readable memory storing further instructions that, when executed by the at least one processor, are further effective to:
determine, in response to the receiving the selection of the first content, that the first identifier data is associated with the first content;
determine that the selection of the first content occurred within a valid session; and
send the attribution data to the remote computing device based at least in part on the selection of the first content occurring within a valid session.

17. The system of claim 13, the non-transitory computer-readable memory storing further instructions that, when executed by the at least one processor, are further effective to:
- receive a registration request;
- determine, using the first speech processing skill, content identification data identifying one or more categories of content and/or one or more content items associated with attribution; and
- generate, in response to the registration request, the first identifier data.

18. The system of claim 13, the non-transitory computer-readable memory storing further instructions that, when executed by the at least one processor, are further effective to:
- determine, in response to the selection of the first content, the first identifier data associated with the first content;
- generate token data comprising the first identifier data and content identifier data identifying the first content; and
- publish the token data using a messaging protocol.

19. The system of claim 18, the non-transitory computer-readable memory storing further instructions that, when executed by the at least one processor, are further effective to:
- receive, by a content attribution platform, the token data;
- parse the token data to determine the first identifier data and the content identifier data; and
- look up the attribution data using the first identifier data.

20. The system of claim 19, the non-transitory computer-readable memory storing further instructions that, when executed by the at least one processor, are further effective to:
- determine one or more categories of content indicated by the attribution data;
- determine that the content identifier data pertains to a first category of content of the one or more categories, wherein the attribution data is specific to the first category of content.

* * * * *